(12) United States Patent
Zhu et al.

(10) Patent No.: US 10,031,940 B2
(45) Date of Patent: Jul. 24, 2018

(54) SYSTEM AND METHOD FOR DATABASE QUERY

(71) Applicant: Futurewei Technologies, Inc., Plano, TX (US)

(72) Inventors: Cheng Zhu, San Jose, CA (US); Yonghua Ding, San Jose, CA (US); Guogen Zhang, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 272 days.

(21) Appl. No.: 14/864,289

(22) Filed: Sep. 24, 2015

(65) Prior Publication Data

US 2017/0091269 A1 Mar. 30, 2017

(51) Int. Cl.
*G06F 7/00* (2006.01)
*G06F 17/30* (2006.01)

(52) U.S. Cl.
CPC .. *G06F 17/30442* (2013.01); *G06F 17/30463* (2013.01); *G06F 17/30569* (2013.01)

(58) Field of Classification Search
CPC ......... G06F 17/30442; G06F 17/30463; G06F 17/30569
USPC ....................................................... 707/719
See application file for complete search history.

(56) References Cited

U.S. PATENT DOCUMENTS

| 6,149,318 | A | * | 11/2000 | Chase | ..................... | G06F 8/437 |
| | | | | | | 714/E11.209 |
| 6,980,985 | B1 | | 12/2005 | Amer-Yahia et al. | | |
| 2004/0186840 | A1 | * | 9/2004 | Dettinger | .......... | G06F 17/30392 |
| 2009/0327214 | A1 | * | 12/2009 | Richardson | ....... | G06F 17/30469 |
| 2011/0029508 | A1 | | 2/2011 | Al-Omari et al. | | |
| 2014/0157247 | A1 | * | 6/2014 | Chang | ................... | G06F 8/4441 |
| | | | | | | 717/146 |

FOREIGN PATENT DOCUMENTS

CN 103324724 A 9/2013

OTHER PUBLICATIONS

Diaconu., C. et al., "Hekaton: SQL Server's Memory-Optimized OLTP Engine," SIGMOD, Jun. 22-27, 2013, 12 pgs.
Li, N., "Inside Cloudera Impala: Runtime Code Generation," http://blog.cloudera.com/blog/2013/02/inside-cloudera-impala.runtime.com, Feb. 11, 2013, 6 pgs.
Neumann, T., "Efficiently Compiling Efficient Query Plans for Modern Hardware," Proceedings of the VLDB Endowment, vol. 4, No. 9, Aug. 29-Sep. 3, 2011, pp. 539-550.

(Continued)

*Primary Examiner* — Tuan A Pham
*Assistant Examiner* — Thai V Dang
(74) *Attorney, Agent, or Firm* — Slater Matsil, LLP

(57) ABSTRACT

A method includes receiving, by a database system, a query statement and forming a runtime plan tree in accordance with the query statement. The method also includes traversing the runtime plan tree including determining whether a function node of the runtime plan tree is qualified for just-in-time (JIT) compilation. Additionally, the method includes, upon determining that the function node is a qualified for JIT compilation producing a string key in accordance with a function of the function node and determining whether a compiled object corresponding to the string key is stored in a compiled object cache.

18 Claims, 3 Drawing Sheets

(56) References Cited

OTHER PUBLICATIONS

"Execution Plan Caching and Reuse," SQL Server 2008 R2, https://technet.microsoft.com/en-US/library/ms181055 (v=SQL.105).aspx, downloaded Sep. 4, 2015, 5 pgs.

Sompolski, Juliusz; "Just-in-time Compilation in Vectorized Query Execution," Master thesis in Computer Science, University of Warsaw, Faculty of Mathematics, Computer Science and Mechanics, VU University Amsterdam, Faculty of Sciences, Aug. 2011, 88 pages.

* cited by examiner

SYSTEM AND METHOD FOR DATABASE QUERY

TECHNICAL FIELD

The present invention relates to a system and method for databases, and, in particular, to a system and method for a database query.

BACKGROUND

In some database management systems, when a database receives a query, after the query is parsed and optimized, a query plan is created. The query plan indicates how to execute the query at runtime. The query plan is passed to the runtime execution engine, which is executed interpretively. While the interpretive approach is relatively easy to understand and implement, it may introduce execution overhead.

SUMMARY

An embodiment method includes receiving, by a database system, a query statement and forming a runtime plan tree in accordance with the query statement. The method also includes traversing the runtime plan tree, including determining whether a function node of the runtime plan tree is qualified for just-in-time (JIT) compilation. Additionally, the method includes, upon determining that the function node is a qualified for JIT compilation, producing a string key in accordance with a function of the function node and determining whether a compiled object corresponding to the string key is stored in a compiled object cache.

An embodiment computer includes a compiled object cache and a processor coupled to the compiled object cache. The computer also includes a non-transitory computer readable storage medium storing programming for execution by the processor. The programming includes instructions to receive a query statement and form a runtime plan tree in accordance with the query statement. The programming also includes instructions to traverse the runtime plan tree including instructions to determine whether a function node of the runtime plan tree is qualified for just-in-time (JIT) compilation. Additionally, the programming includes instructions to, upon determining that the function node is qualified for JIT compilation, produce a string key in accordance with a function of the function node and determine whether a compiled object corresponding to the string key is stored in the compiled object cache.

In an embodiment non-transitory computer readable storage medium storing programming for execution by a processor, the programming includes instructions for receiving, by a database system, a query statement and forming a runtime plan tree in accordance with the query statement. The programming also includes instructions for traversing the runtime plan tree, including determining whether a function node of the runtime plan tree is qualified for just-in-time (JIT) compilation. Additionally, the programming includes instructions for, upon determining that the function node is qualified for JIT compilation, producing a string key in accordance with a function of the function node, and determining whether a compiled object corresponding to the string key is stored in a compiled object cache.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
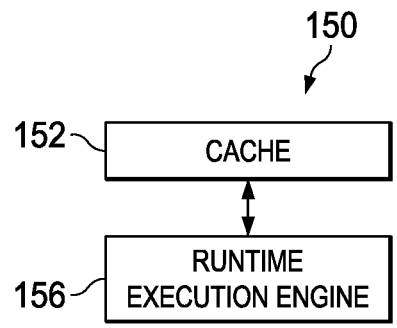
FIG. 1 illustrates an embodiment database system.

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

An interpretive approach to database queries may introduce execution overhead. For example, interpretive query calls may lead to expensive virtual function calls for expression evaluation and loop on items. Unnecessary loop on items may be avoided, because, while the data type might not be known in advance, it may be resolved during runtime. When an expression, for example C1+5, is interpreted, at least three virtual function calls, such as ExprEvalFunc, are generated to retrieve column C1 and constant 5, and evaluate their sum. Also, a large number of switch statements on types, operators, and functions which are not referenced by this expression may lead to extra central processing unit (CPU) cycles. Additionally, extra, unnecessary branch instructions may prevent effective instruction pipelining and instruction level parallelism.

A low level virtual machine (LLVM) compiler framework, which includes just-in-time (JIT) compilers to generate optimized native machine code at runtime, may be used in an embodiment database. A query plan is fragmented into functions. The individual functions in a query plan are then compiled into executable objects, and saved into an object cache. The use of an LLVM framework with JIT compilers may reduce overhead, because the compiled objects may be tailored only for the specific query. The LLVM framework may be used to generate portable assembly code, such as LLVM intermediate representation (IR), where the JIT compiler compiles the LLVM IR format into optimized native machine code for improved performance. The compiled objects in native machine code may be cached for reuse by various query plans using the same functions for execution. For example, when both query 1 and query 2 use the expression C1+5 in their select list, the compiled object that evaluates the result of C1+5 may be shared in both queries inside the runtime execution engine with only one compilation cost using LLVM machine code JIT (MCJIT). However, a conventional database system saves a runtime plan tree into a statement cache, which is retrieved through statement text matching, and involves another compilation before the execution, even when a cache hit occurs.

The LLVM compiler infrastructure is a compiler infrastructure with reusable libraries and well defined interfaces. LLVM may provide middle layers of a complete compiler system, taking IR code from a compiler, and producing an optimized IR code, which may then be converted and linked into assembly code. LLVM may generate relocatable machine code at compile time or at link time, or binary machine code at runtime. An LLVM JIT compiler may optimize unneeded static branches out of a program at runtime. JIT compilation is performed at runtime during execution of a program. JIT compilation may combine the speed of ahead-of-time (AOT) compilation and with the flexibility of interpretation.

Cloudera Impala™ generates a compiled object using the LLVM framework and JIT compilation, but does not save the compiled object after execution.

Microsoft™ (MS) structured query language (SQL) servers compile objects which are saved in a dynamic link list (DLL) library for static statement. The library is recompiled when the table schema underneath is changed.

An embodiment method uses cache SQL query plan fragments with a JIT compiled object in a runtime execution engine to save and retrieve SQL query fragments, which are JIT compiled objects, during execution. A query plan is built and passed to a runtime engine. The query plan includes commonly reusable functions in the statement plan, such as arithmetic expressions, aggregate functions, sort functions, and data access functions, which are identified as JIT compilable functions based on CPU profiling analysis. The functions are generated into IR format using an LLVM framework first. Then, the MCJIT is used to optimize and compile the IR format functions to native machine objects. The compiled objects are saved in a compiled object cache. When either the same query or a different query with the same functions is executed again, the runtime engine retrieves the cached compiled object and executes it directly without re-compilation.

In a runtime engine initialization process, JIT supported functions are normalized into function string keys. For example, an expression of C1+5 becomes "VAR_INT_var_id+CONSTANT_INT_5" from normalization, where "VAR" indicates that C1 is a variable, var_id indicates the index of the column C1 in its table, "CONSTANT" indicates that 5 is a constant, and "INT" indicates that C1 and 5 are both integers. Compiled objects are looked up in cache using function string keys. Symbols are remapped, and addresses of the compiled objects are relocated upon finding a compiled object in the cache. A function pointer is then set to the compiled object. When the object is not found, supported functions are generated in an assembly-like IR format using the LLVM framework. Then, the JIT compiler compiles the IR function into optimized native machine object code, saves the compiled object in the compiled object cache, and sets the function pointer to the compiled object. In the runtime engine execution process, the compiled object pointed to by the function pointer is directly executed.

An embodiment uses query specific machine code generated by an LLVM framework, which may lead to relatively low overhead. Also, by caching JIT compiled objects, the same or different queries may share the same executable objects with LLVM/MCJIT compilation only occurring once for the shared objects. There may be a performance improvement when CPU intensive queries are repeatedly executed.

FIG. 1 illustrates an embodiment database system 150. The database system 150 includes a compiled object cache 152 and a runtime execution engine 156, which includes an LLVM MCJIT execution engine. The runtime execution engine 156 stores compiled objects in the compiled object cache 152 during runtime engine initialization. A query plan is passed into the runtime execution engine 156, which includes commonly reusable functions in the statement plan, such as arithmetic expressions, aggregate functions, sort functions, and data access functions, which are identified based on CPU profiling analysis. The functions are generated into IR format using an LLVM framework first. Then, MCJIT is used to optimize and compile the IR format functions to native machine objects. Later, the compiled object is stored in the compiled object cache 152. During the execution phase, the stored compiled objects are executed directly by the runtime execution engine 156.

Figure 2:
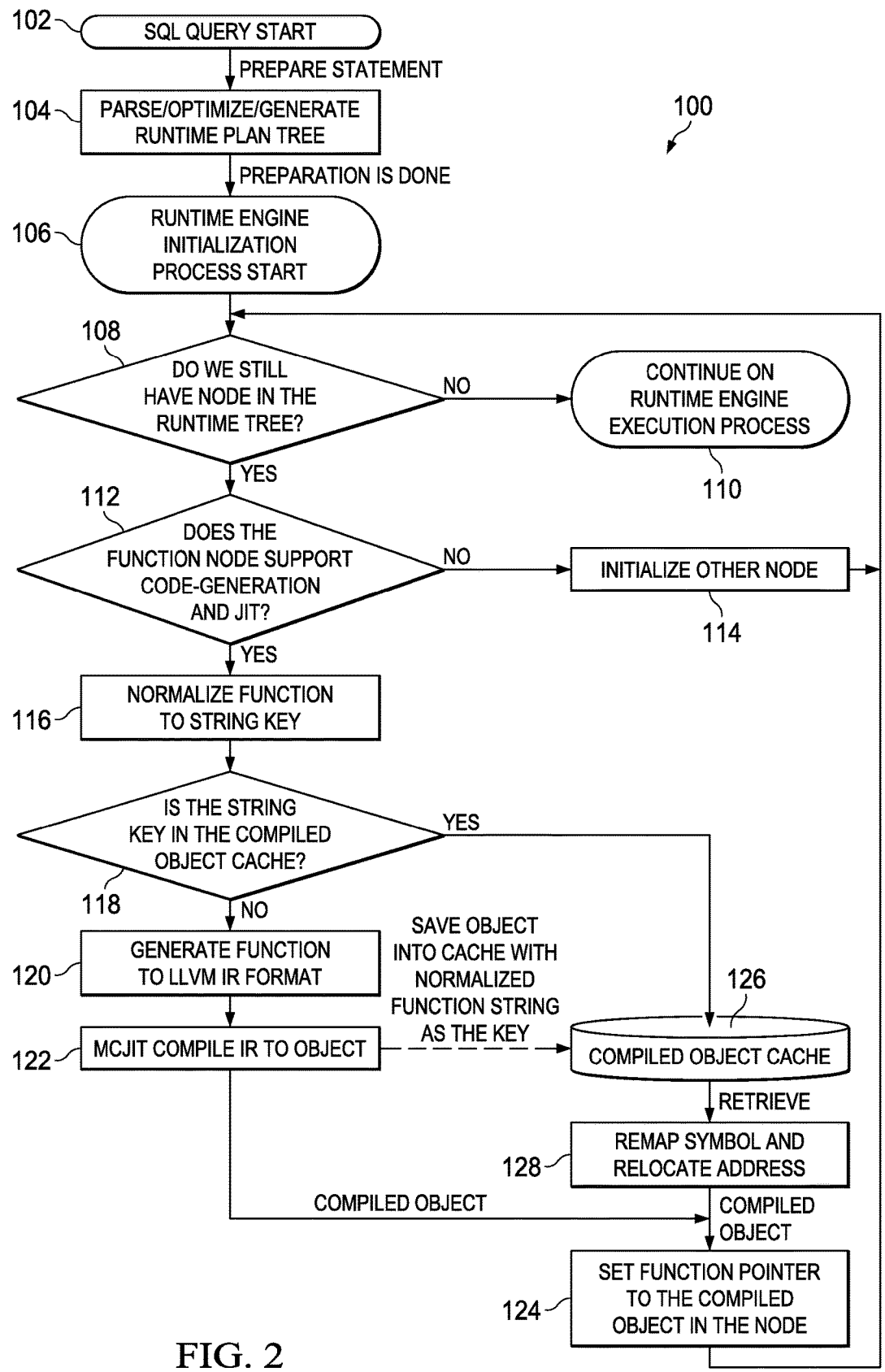
FIG. 2 illustrates a flowchart for an embodiment method of runtime engine initialization for a query process.

FIG. 2 illustrates a flowchart 100 for an embodiment method of runtime engine initialization for a query process. The query process in the runtime execution engine includes runtime engine initialization and execution phases. Initially, in step 102, a SQL query starts. For example, a SQL query may start receiving for SELECT C1+5, C1*5 FROM T1.

Then, in step 104, a runtime plan tree is formed based on the query received in step 102. The query is parsed for syntax errors to form a query plan, and the query plan is optimized. Also, a runtime plan tree is generated from the optimized query plan. Also, the runtime execution engine may determine whether a function of the query statement plan is a JIT supported function using CPU profiling analysis.

When the preparation of step 104 is done, the runtime engine initialization process begins in step 106. The runtime engine starts to initialize the runtime plan in tree structure in preparation of tree traversal.

Then, the runtime engine traverses the runtime plan tree. In step 108, the runtime execution engine determines whether there are remaining nodes to visit in the runtime plan tree. When there are remaining nodes in the runtime plan tree, the runtime execution engine proceeds to step 112. On the other hand, when there are not remaining nodes in the runtime plan tree, the runtime engine proceeds to step 110.

In step 110, the runtime engine execution process continues. The runtime plan tree has been traversed, and the runtime execution engine is ready for execution of the runtime plan.

In step 112, the runtime engine determines whether the function node supports code generation and JIT. For every node in the tree, function nodes are identified based on whether they are code generation and JIT enabled based on the CPU profiling analysis. The supported function nodes include expression function nodes, sort function nodes, aggregation function nodes, data access nodes, and other node types. When the function node supports code generation and JIT, the runtime engine proceeds to step 116. When the function node does not support code generation and JIT, the runtime engine proceeds to step 114.

In step 114, the runtime execution engine initializes another node in the runtime plan tree. Then, the runtime engine proceeds to step 108 to continue traversing the runtime plan tree.

In step 116, the runtime engine normalizes the function in the node to a string key. For example, an expression of C1+5 becomes "VAR_INT_var_id+CONSTANT_INT_5" as result of the normalization, where "VAR" indicates that C1 is a variable, var_id indicates the index of the column C1 in its table, "CONSTANT" indicates that 5 is a constant, and "INT" indicates that C1 and 5 are integers.

Then, in step 118, the runtime execution engine determines whether the compiled object, the string key, for example, is in the compiled object cache. When the compiled object with the string key is not in the compiled object cache, the runtime execution engine proceeds to step 120. On the other hand, when the compiled object with the string key is in the compiled object cache, the runtime execution engine proceeds to compiled object cache 126 to retrieve the object.

In compiled object cache 126, the compiled object is retrieved from the compiled object cache. This is done using a pointer from the function node to the compiled object.

Next, in step 128, the runtime execution engine remaps symbols and relocates addresses for the compiled object, and proceeds to step 124 with the compiled object.

In step 120, the runtime execution engine generates the function in LLVM IR format function.

Then, in step 122, the MCJIT compiles the LLVM IR format function to produce a compiled object. The compiled object is saved into compiled object cache 126 with the normalized function string used as the string key. The runtime execution engine then proceeds to step 124 with the compiled object.

In step 124, the runtime execution engine sets the function pointer to the compiled object in the function node. Then, the runtime execution engine proceeds to step 108 to continue traversal of the runtime plan tree.

Figure 3:
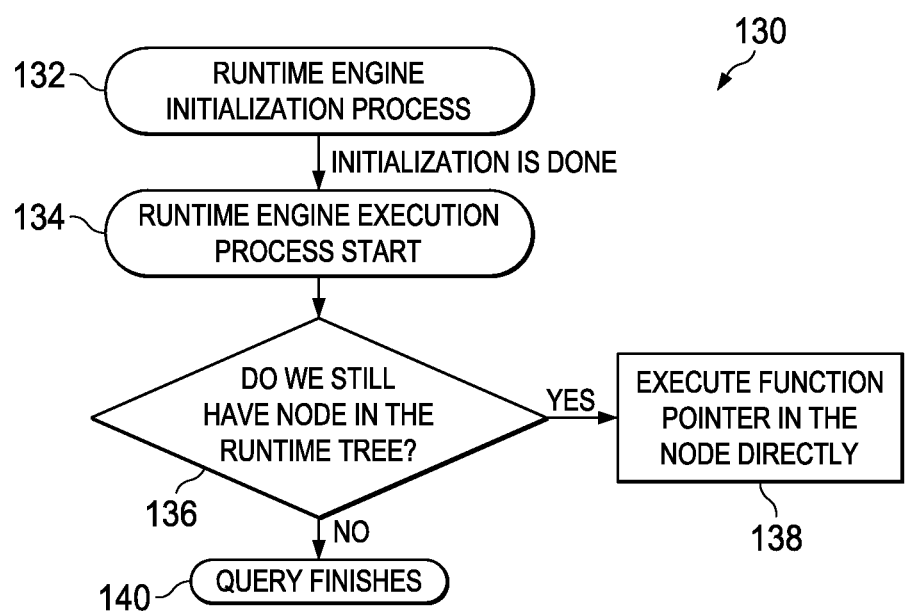
FIG. 3 illustrates a flowchart for an embodiment method of runtime engine execution.

Runtime engine execution may be performed after runtime engine initialization. FIG. 3 illustrates a flowchart 130 for an embodiment method of runtime engine execution. Initially, in step 132, the runtime engine initialization process is performed. For example, the runtime engine initialization process illustrated by flowchart 100 of FIG. 2 may be performed.

After runtime engine initialization is performed, the runtime engine execution process starts in step 134. After the runtime engine initialization process, function nodes of a runtime plan tree contain pointers. For nodes supporting code generation and JIT, the pointers point to executable compiled objects which may be directly executed.

Then, in step 136, the runtime execution engine determines whether there are additional nodes in the runtime plan tree. When there are no additional nodes in the runtime plan tree, the query finishes in step 140. When there are additional nodes in the runtime plan tree, the runtime execution engine proceeds to step 138.

In step 138, the runtime execution engine executes a function pointer in the node directly. The pointer points to a compiled object in the cache.

In one example, a query is SELECT C1+5, C1*5 FROM T1. Table T1 contains C1, which is an integer column. Function nodes, such as sort function nodes, aggregate function nodes, and data access nodes, may use code generation and JIT to compile and save compiled objects into compiled object cache for later reuse. When the function node supports function code generation and JIT, the function is normalized to a string key, a cache process is performed, and the reuse process is performed for compiled objects from the compiled object cache.

The function node is normalized to a string key. The expressions C1+5 and C1*5 are normalized to the strings "VAL_INT_var_id+CONSTANT_INT_5" and "VAL_INT_var_id*CONSTANT_INT_5," respectively. The normalized strings are the search keys which are used to look up previously compiled objects in the compiled object cache. To represent different types of function nodes, the functions are normalized into different strings. Table 1, below, illustrates the resulting strings after normalization, which may be used to search compiled objects in cache. Table 1 shows how to translate functions to string keys. In one example of an aggregate node function, the SQL statement "SELECT COUNT(*) FROM T1 GROUP BY C1" is translated to the string "COUNT(*)_GRP_VAR_INT_INDX1," where "GRP" indicates a group, "VAR indicates a column, "INT" represents an integer, and "INDX1" indicates an index. In another example of an aggregate function node, the SQL statement "SELECT SUM(C1) FROM T1" is translated to "SUM(VAR_INT_IDX1)." In an example of a sort function node, the SQL statement, "SELECT C1, C2 FROM T1 ORDER BY C1" is translated to the string "SORT(VAR_INT_IDX1,T1)." In another sort function node example, the SQL statement "SELECT T1.C1, T2.C2 FROM T1,T2 WHERE T1.C1=T2.C3" is translated to the resulting string key "SORT(VAR_INT_IDX1,T1)." When the string is optimized, T1 is sorted on C1 before joining. For an example data access function node, the SQL statement, "SELECT C1, C2, C3 FROM T1" results in the string key "ACCESS(VAR_INT_IDX1, VAR_INT_IDX2, VAR_INT_IDX3, T1)." When the string key does not result in a cache hit from compiled object cache, the flow goes to cache processes to compile the function object code and save it in the cache.

TABLE 1

| Node type | SQL statement representing those function nodes | Result string key |
| --- | --- | --- |
| Aggregate function node | SELECT COUNT(*) FROM T1 GROUP BY C1 | COUNT(*)_GRP_VAR_INT_IDX1 |
| | SELECT SUM(C1) FROM T1 | SUM(VAR_INT_IDX1) |
| Sort function node | SELECT C1, C2 FROM T1 ORDER BY C1 | SORT(VAR_INT_IDX1, T1) |
| | SELECT T1.C1, T2.C2 FROM T1, T2 WHERE T1.C1 = T2.C3 | SORT(VAR_INT_IDX1, T1) |

TABLE 1-continued

| Node type | SQL statement representing those function nodes | Result string key |
|---|---|---|
| Data access function node | SELECT C1, C2, C3 FROM T1 | ACCESS(VAR_INT_IDX1, VAR_INT_IDX2, VAR_INT_IDX3, T1) |
| Expression function node | SELECT C1 + 5 FROM T1 | VAR_INT_var_id + CONSTANT_INT_5 |

When the compiled object cache does not contain the previously compiled object for the string key, the cache process is performed. The cache process rewrites functions using the LLVM framework and generates the functions into LLVM IR format. Then, the LLVM IR format is passed into the LLVM MCJIT compiler, which compiles and optimizes the IR format function into native machine code objects. The machine code object, i.e. the compiled object, is saved into the compiled object cache storage for compiled objects for later search and reuse.

When a compiled object is not found in the compiled object cache, the LLVM framework generates the functions into LLVM functions in IR form. The pseudo code below illustrates an example of converting an expression function, e.g. C1+5, into an LLVM function in IR format using LLVM framework. The expression C1+5 is converted to a tree representation. The column C1 is converted to type T_Var, the constant value 5 is converted to the type T_Const, and the operator "+" is converted to the type T_OpExrp. The llvmExecInitExpr function converts a tree representation of C1+5 into an IR format using methods in IRBuilder provided by the LLVM framework. For each type of node (i.e. T_Var of C1, T_Const of 5, and T_OpExpr+), an LLVM function prototype is initially built. Then, a function is built from the expression tree, and saved as the final one (JittedOpExpr) at the top of the expression (T_OpExpr_node). The final assembly-like functions include functions to retrieve column C1 value using existing data access functions, retrieve constant 5, and return the sum of these two values.

```
ExprState* llvmExecInitExpr (Expr* node, PlanState* parent)
{ ......
  switch(node->type) {
    ......
    case T_Var: // Column C1 fall here
    {
      Create llvm function prototype to call existing ExecEvalExpr function
      Build llvm function JittedExprGetValue and add it to node->llvmfunc
    }
    case T_Const: // Constant value 5 fall here
    {
      Create llvm function prototype to retrieve literal constant value 5
      Build llvm function JittedIntLit and add it to node-> llvmfunc
    }
    case T_OpExpr: // Operator + fall here
    {
      foreach child in argument list call llvmExecInitExpr(child, parent)
      Create llvm function prototype to add children's result together
      Build llvm function JittedOpExpr and add it to node-> llvmfunc
    }
    .....
}
```

The code generation result of an IR format without code optimization is shown below.

```
define i64 @JittedExprGetValue(%struct.ExprState* %expr,
%struct.ExprContext* %econtext, i8* %isNull, i32* %isDone) #0 {
entry:
  %expr.addr = alloca %struct.ExprState*, align 8
  %econtext.addr = alloca %struct.ExprContext*, align 8
  %isNull.addr = alloca i8*, align 8
  %isDone.addr = alloca i32*, align 8
  store %struct.ExprState* %expr, %struct.ExprState** %expr.addr,
align 8
  store %struct.ExprContext* %econtext, %struct.ExprContext**
%econtext.addr, align 8
  store i8* %isNull, i8** %isNull.addr, align 8
  store i32* %isDone, i32** %isDone.addr, align 8
  %0 = load %struct.ExprState** %expr.addr, align 8
  %evalfunc = getelementptr inbounds %struct.ExprState* %0, i32 0, i32 2
  %evalfunc1 = bitcast { }** %evalfunc to i64 (%struct.ExprState*,
%struct.ExprContext*, i8*, i32*)**
  %1 = load i64 (%struct.ExprState*, %struct.ExprContext*, i8*, i32*)**
%evalfunc1, align 8
  %2 = load %struct.ExprState** %expr.addr, align 8
  %3 = load %struct.ExprContext** %econtext.addr, align 8
  %4 = load i8** %isNull.addr, align 8
  %5 = load i32** %isDone.addr, align 8
  %call = call i64 %1(%struct.ExprState* %2, %struct.ExprContext* %3,
i8* %4, i32* %5)
  ret i64 %call
}
define i64 @JittedIntLit( ) {
entry:
  ret i64 5
}
define i64 @JittedOpExpr(%struct.ExprState* %expr,
%struct.ExprContext* %econtext, i8* %isNull, i32* %isDone) {
entry:
  %lhs = call i64 @IrExprGetValue1(%struct.ExprState* %expr,
%struct.ExprContext* %econtext, i8* %isNull, i32* %isDone)
  %rhs = call i64 @JittedIntLit( )
  %tmp_add = add i64 %lhs, %rhs
  ret i64 %tmp_add
}
```

The code generation result of an IR format with code optimization is illustrated below. Both @JittedExprGetValue and @JittedIntLit have been optimized to be inline inside @JittedOpExpr after optimization by the LLVM framework.

```
define i64 @JittedOpExpr(%struct.ExprState* %expr,
%struct.ExprContext* %econtext, i8* %isNull, i32* %isDone) {
entry:
  %evalfunc.i = getelementptr inbounds %struct.ExprState* %expr, i64 0,
i32 2
  %evalfunc12.i = load { }** %evalfunc.i, align 8
  %0 = bitcast { }* %evalfunc12.i to i64 (%struct.ExprState*,
%struct.ExprContext*, i8*, i32*)*
  %call.i = tail call i64 %0(%struct.ExprState* %expr,
%struct.ExprContext* %econtext, i8* %isNull, i32* %isDone)
  %tmp_add = add i64 %call.i, 5
  ret i64 %tmp_add
}
```

The intermediate result in IR form is passed to the MCJIT compiler, which compiles the IR format function into native machine code objects. The machine code object, i.e. the compiled object, may be saved into the database in the compiled object cache storage. A hashmap may be used as the data structure to map a normalized expression string with compiled objects. For example, the normalized string "VAR_INT_var_id+CONSTANT_INT_5" and the string "VAR_INT_var_id*CONSTANT_INT_5" are used as keys to map to the expressions C1+5 and C1*5, respectively, for the compiled objects. The VAR_INT_var_id is set for the column at the left side of the operator, even for an expression such as "5+C1." The MCJIT compiler returns a pointer to the compiled object, and associates the function node pointer which points to this executable object.

When the compiled object cache contains the previously compiled object for the string key, the compiled objects from the compiled object cache are reused. A matched previously compiled object is loaded into the MCJIT compiler. After symbol remapping and address relocation, the object may be executed by the runtime execution engine directly without knowing that it actually came from a previously compiled object.

The rest of the plan tree is processed, until the runtime engine initialization process finishes.

For nodes supporting code generation and JIT, when the function pointer already points to executable compiled objects, the compiled objects may be executed directly during runtime execution.

An embodiment saves the compiled objects, which may be directly executed. JIT compiled objects are combined in object cache to reduce overhead and share the compiled objects among queries to improve performance. Because not all of the function nodes in the runtime plan tree are processed, and only the supported function nodes may hit the cache, the statement is partially cached. In an embodiment, an increasing number of queries will hit the cache, because fragments of a query execution plan are cached. In an embodiment, executable objects are directly reused without compiling again. In an embodiment, JIT compiled code is optimized for a target native machine.

Figure 4:
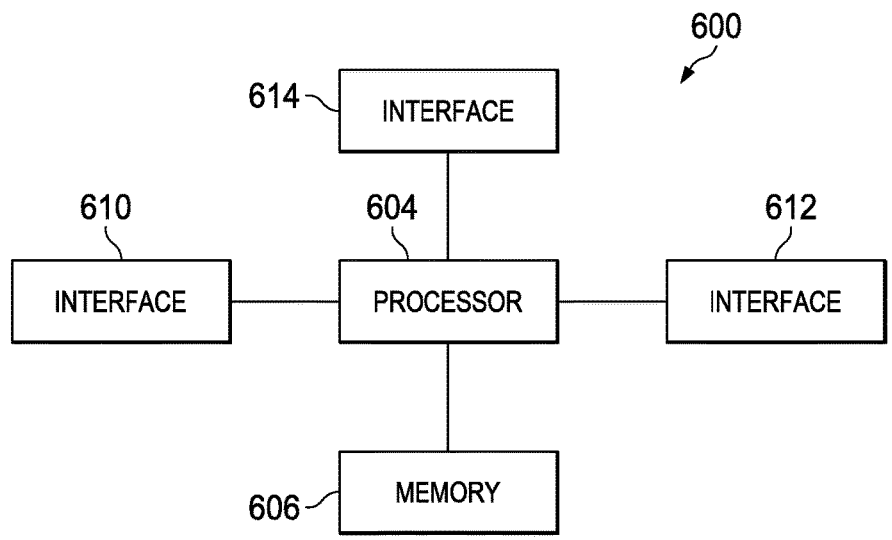
FIG. 4 illustrates a block diagram of an embodiment processing system.

FIG. 4 illustrates a block diagram of an embodiment processing system 600 for performing methods described herein. The processing system 600 may be installed in a host device. As shown, the processing system 600 includes a processor 604, a memory 606, and interfaces 610-614, which may (or may not) be arranged as shown in FIG. 4. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 4, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 5:
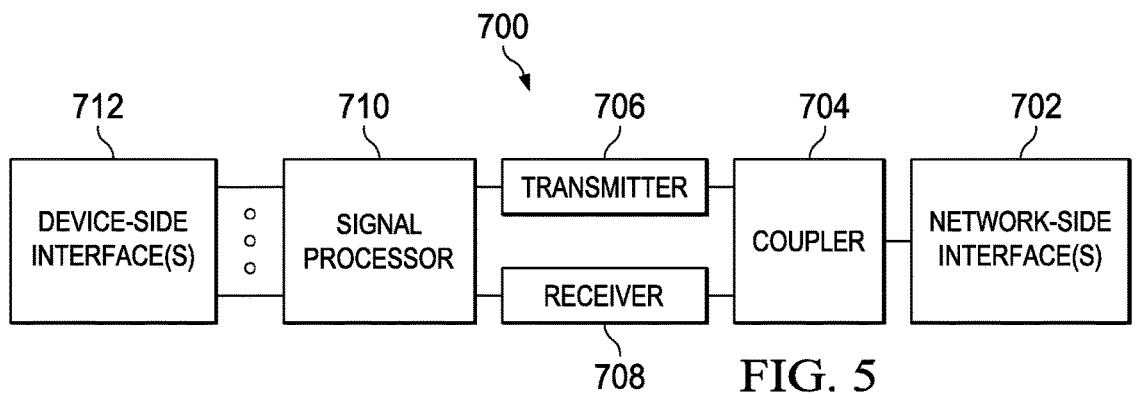
FIG. 5 illustrates a block diagram of an embodiment transceiver.

In some embodiments, one or more of the interfaces 610, 612, 614 connects the processing system 600 to a transceiver adapted to transmit and receive signaling over the telecommunications network. FIG. 5 illustrates a block diagram of a transceiver 700. The transceiver 700 in the example is adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   receiving, by a database system, a query;
   forming a runtime plan tree corresponding to the query for executing the query, the runtime plan tree comprising a plurality of function nodes corresponding to functions to be executed for executing the query;
   traversing the runtime plan tree, comprising:
      determining whether a first function node of the runtime plan tree supports code generation and just-in-time (JIT) compilation; and
      upon determining that the first function node supports the code generation and JIT compilation, translating a first function of the first function node into a first string key; and
      determining whether a first compiled object corresponding to the first string key is stored in a compiled object cache, the compiled object cache comprising a plurality of compiled objects corresponding to query functions that have been compiled, and each of the plurality of compiled objects being associated with a string key, wherein each of the plurality of compiled objects is reusable for executing queries that comprise a corresponding query function; and
   executing the query, comprising executing the first function by directly executing the first compiled object without compiling the first function when the first compiled object is stored in the compiled object cache, and wherein traversing the runtime plan tree further comprises:
      machine code just-in-time (MCJIT) compiling a low level virtual machine (LLVM) intermediate representation (IR) format function to produce a compiled object, wherein the LLVM IR format function corresponds to a query function; and
      storing the compiled object in the compiled object cache.

2. The method of claim 1, further comprising performing runtime execution after traversing the runtime plan tree.

3. The method of claim 1, wherein determining whether the first function node supports the code generation and JIT compilation comprises performing a central processing unit (CPU) profiling analysis.

4. The method of claim 1, further comprising determining whether initialization of the runtime plan tree is complete.

5. The method of claim 4, further comprising performing runtime execution upon determining that the initialization of the runtime plan tree is complete.

6. The method of claim 1, wherein traversing the runtime plan tree further comprises, upon determining that the first compiled object corresponding to the first string key is in the compiled object cache:
   retrieving the first compiled object from the compiled object cache in accordance with the first string key; and
   setting a function pointer to the first compiled object.

7. The method of claim 6, wherein traversing the runtime plan tree further comprises, upon determining that the first compiled object is in the compiled object cache:
   remapping symbols for the first compiled object; and
   relocating an address of symbols for the first compiled object.

8. The method of claim 1, wherein traversing the runtime plan tree further comprises, upon determining that the first compiled object is not in the compiled object cache, generating a first LLVM IR format function in accordance with the first function of the first function node.

9. The method of claim 1, wherein traversing the runtime plan tree further comprises setting a function pointer to a compiled object in the compiled object cache.

10. The method of claim 1, wherein MCJIT compiling the LLVM IR format function comprises compiling a set of functions that comprises a plurality of fragments of a query plan.

11. A computer comprising:
   a compiled object cache comprising a plurality of compiled objects corresponding to query functions that have been compiled, each of the plurality of compiled objects being associated with a string key, and being reusable for executing queries that comprise a corresponding query function;
   a processor coupled to the compiled object cache; and
   a non-transitory computer readable storage medium storing programming for execution by the processor, the programming including instructions to:
      receive a query,
      form a runtime plan tree corresponding to the query for executing the query, the runtime plan tree comprising a plurality of function nodes corresponding to functions to be executed for executing the query,
      traverse the runtime plan tree, the instructions comprising further instructions to:
         determine whether a first function node of the runtime plan tree supports code generation and just-in-time (JIT) compilation, and
         upon determining that the first function node supports the code generation and JIT compilation, translate a first function of the first function node into a first string key, and
         determine whether a first compiled object corresponding to the first string key is stored in the compiled object cache; and
      execute the query, wherein the first function is executed by directly executing the first compiled object without compiling the first function when the first compiled object is stored in the compiled object cache, and wherein the instructions to traverse the runtime plan tree further comprise instructions to:
         machine code just-in-time (MCJIT) compile a low level virtual machine (LLVM) intermediate representation (IR) format function to produce a compiled object, wherein the LLVM IR format function corresponds to a query function; and
store the compiled object in the compiled object cache.

12. The computer of claim 11, wherein whether the first function node supports the code generation and JIT compilation is determined by performing a central processing unit (CPU) profiling analysis.

13. The computer of claim 11, wherein the instructions further comprise instructions to determine whether initialization of the runtime plan tree is complete.

14. The computer of claim 11, wherein the instructions to traverse the runtime plan tree further comprise instructions to, upon determining that the first compiled object corresponding to the first string key is in the compiled object cache,
retrieve the first compiled object from the compiled object cache in accordance with the first string key; and
set a function pointer to the first compiled object.

15. The computer of claim 11, wherein the instructions to traverse the runtime plan tree further comprise instructions to, upon determining that the first compiled object is not in the compiled object cache, generate a first LLVM IR format function in accordance with the first function of the first function node.

16. The computer of claim 11, wherein the instructions to traverse the runtime plan tree further comprise instructions to set a function pointer to a compiled object in the compiled object cache.

17. The computer of claim 11, wherein the instructions to MCJIT compile the LLVM IR format function comprise instructions to compile a set of functions comprising a plurality of fragments of a query plan.

18. A non-transitory computer readable storage medium storing programming for execution by a processor, the programming including instructions for:
receiving, by a database system, a query;
forming a runtime plan tree corresponding to the query for executing the query, the runtime plan tree comprising a plurality of function nodes corresponding to functions to be executed for executing the query;
traversing the runtime plan tree, comprising:
determining whether a first function node of the runtime plan tree supports code generation and just-in-time (JIT) compilation, and upon determining that the first function node supports the code generation and JIT compilation: translating a first function of the first function node into a first string key, and determining whether a first compiled object corresponding to the first string key is stored in a compiled object cache, the compiled object cache comprising a plurality of compiled objects corresponding to query functions that have been compiled, and each of the plurality of compiled objects being associated with a string key, wherein each of the plurality of compiled objects is reusable for executing queries that comprise a corresponding query function; and
executing the query, comprising executing the first function by directly executing the first compiled object without compiling the first function when the first compiled object is stored in the compiled object cache, and wherein traversing the runtime plan tree further comprises:
machine code just-in-time (MCJIT) compiling a low level virtual machine (LLVM) intermediate representation (IR) format function to produce a compiled object, wherein the LLVM IR format function corresponds to a query function; and
storing the compiled object in the compiled object cache.

* * * * *